March 11, 1969   J. J. KOCISCIN   3,432,606
STABILIZED ARCS IN ELECTRIC FURNACES
Filed March 7, 1967
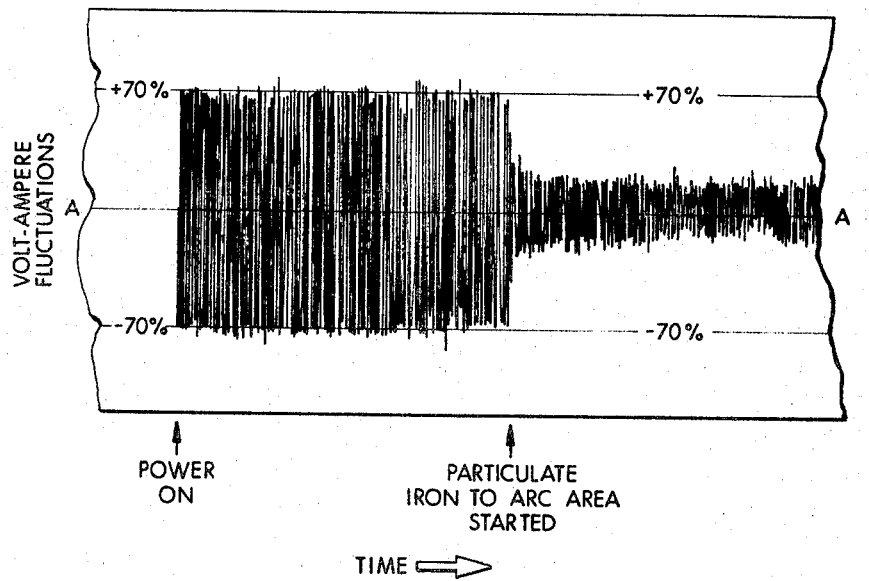
J. J. KOCISCIN Inventor

United States Patent Office 3,432,606
Patented Mar. 11, 1969

3,432,606
STABILIZED ARCS IN ELECTRIC FURNACES
Joseph J. Kociscin, Kenilworth, N.J., assignor to Esso Research and Engineering Company, a corporation of Delaware
Filed Mar. 7, 1967, Ser. No. 621,207
U.S. Cl. 13—33                                     7 Claims
Int. Cl. H05b 1/00

ABSTRACT OF THE DISCLOSURE

The stability and efficiency of the arcs in an electric furnace are improved by continuous addition of fine iron-containing particles in the vicinity of the arcs.

Background of the invention

This invention relates to improvements in electric arc furnace processes. More particularly, it relates to processes for heating, melting or refining metallic charges, especially iron-containing charges, in electric arc furnaces.

The use of electric arc furnaces is becoming very common in metal refining industries, particularly steelmaking industries. A conventional electric arc furnace usually consists of a cylindrical metal shell enclosed at the bottom and having a movable top for easy access to the interior. The shell is lined with heat-resistant refractory materials such as silica or magnesite bricks. Electrodes are provided to supply power to the furnace and usually extend vertically through the roof.

In a typical operation high purity iron such as pig iron, along with scrap materials, alloy constituents, slag, etc., are charged batch-wise to the furnace. The removable roof is then replaced on top of the furnace and the electrodes are lowered to a position ranging generally from about 1 inch to about 6 inches from the tips of the electrodes to the metallic charge. Power is switched to the electrodes and electric arcs are struck between the electrode tips and the metallic charge below. Radiation and heat from the passage of electric current melts the charge. Sometimes only iron and slag are added initially, and then after the iron is melted other agents or alloying ingredients are added and then additional refining or treating steps are carried out.

One very severe problem which has heretofore handicapped arc furnaces has been the inherent instability of the electric arcs. In a typical process the electric arcs dance about over the surface of the charge, shifting from one spot to another both on the charge and on the surface of the electrodes. This shifting and dancing of the arc results in great fluctuations in current to the metallic charge. This type of operation is inherently inefficient. Thus, each electric arc furnace circuit has an optimum rate of current flow for which maximum power is transmitted to the charge by the electric arc. Fluctuations in the current above or below the optimum result, in practice, in enormous power losses of 10 to 30% or even higher, due to instantaneous changes in the circuit impedance. Moreover, massive current fluctuations can upset entire power supply circuits by sudden changes in demand. Even with vast expenditures for protective equipment such as synchronous condensers, the fluctuations are often economically intolerable and dictate the use of some other type of furnace.

General statement of the invention

In accordance with this invention, arc stability can be greatly improved, and fluctuations in power delivered to the metallic charge in electric arc furnaces can be minimized.

This invention contemplates continuously adding particulate iron having particle sizes substantially in the range from about 1 to about 10,000 microns, averaging about 50 to 500 microns, to a zone close to the arc in an electric arc furnace containing a metallic charge beneath an electrode. The amount of particulate iron added is adjusted to substantially improve the stability of the arc while being insufficient to short-circuit the arc either from one electrode to another or from one electrode to the metallic charge.

Generally the amount of particulate iron required in accordance with this invention is an amount sufficient to provide in the space between the electrode and the metallic charge an average concentration above at least about 0.001 lb. of particulate iron per cubic foot of space, i.e., the volume of space included in the zone defined by projecting the cross-section of the electrode downwardly to the surface of the metallic charge. Preferably the average concentration in the space beneath the electrode will be about 0.003 to about 50 lbs. of particulate iron per cubic foot of space.

Preferably the particulate iron is added directly to the space beneath the electrode; however, good results can be achieved by introducing the particles as much as 12 inches away from the arc, or even further, depending, e.g., on the particle size, arc length and the intensity of electromagnetic effects, as well as gas turbulence in the furnace. Thus, there are strong non-uniform electric fields and electromagnetic forces in the vicinity of the arc which attract the iron particles and draw them toward or into the arc. Also, there is considerable turbulence of gases in the furnace due, among other things, to the extreme thermal gradients. These various forces govern how far the particles can move toward the arc before they fall into the metallic charge below. Small particles are, of course, more mobile than large ones and can be introduced at a greater distance from the arc. Similarly, the particles can move further with respect to long arcs than short ones. Undersize particles are undesirable as they tend to be entrained excessively and carried out of the furnace by ascending gases. Conversely, oversize particles lack mobility and are difficult to convey into the arcs in a uniform and homogeneous manner.

Especially advantageous use of this invention can be made by introducing particulate iron into the delta-shaped space between the three electrodes of a conventional three-electrode arc furnace. In such a furnace the three electrodes are generally spaced or positioned approximately to form three corners of a triangle usually centered in the cylindrical furnace. The particulate iron of this invention can be introduced onto the electrodes or into the delta or triangular space and dispersed enough to provide, in the arcing zone between the electrodes and the metallic charge, sufficient amounts of particulate iron to substantially improve the stability of the arcs but insufficient to short-circuit the arcs. Very large amounts of particulate iron can be added in this manner without short-circuiting the arcs; for example, in a continuous operation the iron can be added as fast as it will melt without causing too high concentrations.

Brief description of the drawing

The drawing of this application shows a typical chart recording the reduction of volt-amperage fluctuations to the arcs which is achieved by adding particulate iron to a furnace in accordance with this invention.

Description of the preferred embodiment

A reduced iron ore feed material is prepared for use in accordance with this invention by reducing particulate iron ore in a fluidized bed reduction process. The reduction is carried out by passing an iron ore consisting mainly of $Fe_2O_3$ downwardly through a series of staged fluidized beds to be progressively reduced therein by direct contact with reducing gases containing hydrogen and carbon monoxide at temperatures ranging from about 900–1600° F. The ore is progressively reduced through compositions approximating magnetite ($Fe_3O_4$) and further through ferrous oxide (FeO) to yield a product having 95% metallization. The term "metallization" means the percentage of total iron in the product which is present as metallic Fe. The remaining 5% of the iron is present primarily as FeO. There are also minor amounts of impurities such as siliceous gangue which were present in the original unreduced ore and were carried through the reduction process. The reduced ore particles range in size from about 10 to 5000 microns in size, averaging 250 microns, and are especially suitable for use in this invention because of their composition and melting characteristics as well as their ease in handling and conveying in gaseous media.

Reduced ore from the fluidized ore reduction process is charged along the with conventional scrap metal and slag ingredients to partially fill a conventional three-electrode one ton electric arc furnace. Power is switched to the electrodes and an arc is struck between the electrodes and the metallic charge materials below. Referring specifically to the drawing of this application, the time at which power is turned on is shown on the abscissa (the time scale). Line A—A on the ordinate indicates the volt amperage for the circuit at which arc power is optimum. Violent arc amperage fluctuations, as indicated by the circuit volt-amperage fluctuations of plus or minus 70% from the optimum, are recorded. Additional particulate reduced iron ore is then added at a rate of about one ton per hour to the delta-shaped space between the electrodes by means of a feed line through the roof of the electric furnace. Turbulence of gases and electromagnetic forces in the area disperse the particles, and it is estimated that there is about 0.004 lb. of iron per cubic foot of space between the electrodes and the charge below. As indicated on the drawing, the circuit volt-amperage fluctuations are dramatically reduced to only about one-fourth of their previous magnitude.

It will be appreciated by those skilled in the art that any conventional steelmaking recipes can be used and scrap, alloying materials, slag ingredients, agglomerates or iron briquettes, etc., can be added batch-wise or continuously either separately or with the particulate iron or reduced ore.

The reasons for the remarkable results achieved in accordance with this invention are not known. While applicants do not wish to be bound by any particular theory, it is believed that the presence of particulate iron in and around the arcs affects in a favorable manner the dielectric constant, and therefore the voltage, across the space between the electrodes and the metallic charge below. Very small amounts of particulate iron can be used if it is introduced in the immediate vicinity of the electrodes so that the amount of iron actually in the space between the electrodes and the metallic charge is sufficient to improve arc stability, i.e., generally above about 0.001 lb./cubic foot of space. This can be accomplished, e.g., by mounting a sleeve or collar around each electrode and introducing particulate iron in the annular space between the sleeve and the electrode so that the particles fall downwardly into the arc zone.

Alternatively, the advantages of this invention can be achieved by introducing large quantities of iron at some distance from the electrodes as, for example, in the center of the delta space, and the general turbulence of gases and the electrical forces across the space will carry a sufficient amount of particles into the vicinity of the arcs to improve operations. The particles can, of course, be introduced at still greater distances by injecting them with enough force to carry them close to the arcs, as, for example, by entraining them in a gas and blowing them into the electrode zones.

Since the greatest advantages of this invention are achieved by long periods of continuous operation, it is most preferred, when practical, to add all the steelmaking ingredients continuously and simultaneously to withdraw molten product continuously in a steady-state operation.

The invention is not intended to be limited by the preceding embodiment, which is illustrative, and the full scope of the invention should be given to the attached claims.

What is claimed is:

1. A method for stabilizing an arc in an electric furnace wherein said arc extends generally vertically between a metallic charge and an electrode spaced above the charge which comprises continuously adding particulate iron having particle sizes substantially in the range from about 1 to about 10,000 microns, and averaging about 50 to about 500 microns, to a zone close to the arc in an amount sufficient to substantially improve the stability of the arc but insufficient to short-circuit the arc.

2. The method of claim 1 wherein the particulate iron is added to said zone in an amount sufficient to provide in the space between the electrode and the metallic charge an average concentration above about 0.001 lb. of particulate iron per cubic foot of space.

3. The method of claim 2 wherein said concentration is in range from about 0.003 to about 50 lbs. of particulate iron per cubic foot of space.

4. The method of claim 3 wherein said particulate iron is added by entraining it in a gas and blowing it into said zone.

5. In an electric furnace process wherein said furnace contains three vertical electrodes in spaced-apart relation in a delta-shaped pattern above a metallic charge and wherein electric arcs extend between the electrodes and the metallic charge, the improvement comprising continuously adding to the space between electrodes particulate iron having particle sizes substantially in the range from about 1 to about 10,000 microns, and averaging about 50 to about 500 microns, passing the particulate iron downwardly between said arcs, dispersing said particulate iron sufficiently to provide in the spaces between the electrodes and the metallic charge amounts of particulate iron sufficient to substantially improve the stability of the arcs but insufficient to short-circuit the arcs.

6. The process of claim 5 wherein at least a major portion of said particulate iron is reduced iron ore prepared by the direct reduction of ore in a fluidized iron ore reduction process.

7. The process of claim 6 wherein steelmaking ingredients are continuously added to the furnace and molten product is continuously withdrawn in a steady-state operation.

References Cited

UNITED STATES PATENTS

| | | | |
|---|---|---|---|
| 3,031,345 | 4/1962 | Shrubsall | 219—73 X |
| 3,101,385 | 8/1963 | Robinson | 13—9 X |
| 3,163,520 | 12/1964 | Collin et al. | 13—33 X |

BERNARD A. GILHEANY, *Primary Examiner.*

R. N. ENVALL, Jr., *Assistant Examiner.*

U.S. Cl. X.R.

75—10; 266—34